(12) United States Patent
Adams

(10) Patent No.: US 9,407,661 B2
(45) Date of Patent: Aug. 2, 2016

(54) BLOCKING VIA AN UNSOLVABLE CAPTCHA

(71) Applicant: Juniper Networks, Inc., Sunnyvale, CA (US)

(72) Inventor: Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 291 days.

(21) Appl. No.: 14/042,184

(22) Filed: Sep. 30, 2013

(65) Prior Publication Data

US 2015/0095981 A1 Apr. 2, 2015

(51) Int. Cl.
*G08B 23/00* (2006.01)
*G06F 11/00* (2006.01)
*G06F 12/14* (2006.01)
*G06F 12/16* (2006.01)
*G06F 15/173* (2006.01)
*H04L 29/06* (2006.01)
*G06F 21/55* (2013.01)

(52) U.S. Cl.
CPC .......... *H04L 63/1491* (2013.01); *G06F 21/554* (2013.01); *G06F 2221/2133* (2013.01)

(58) Field of Classification Search
CPC ... H04L 63/08; H04L 63/083; H04L 63/1458; H04L 63/1408; H04L 63/1441; H04L 63/1425; H04L 9/3271; H04L 9/3226; G06F 21/36; G06F 21/31; G06F 21/00; G06F 2221/2133; G06F 2221/2103
USPC ...................................................... 726/22–25
See application file for complete search history.

(56) References Cited

U.S. PATENT DOCUMENTS

| 7,606,915 | B1 * | 10/2009 | Calinov | G06F 21/36 70/229 |
| 8,312,540 | B1 * | 11/2012 | Kahn | G06F 21/552 713/183 |
| 2009/0150983 | A1 * | 6/2009 | Saxena | G06F 21/36 726/7 |
| 2010/0192201 | A1 * | 7/2010 | Shimoni | G06F 21/55 726/3 |

OTHER PUBLICATIONS

"Intrusion Deception: The 'Tar Trap' Approach to Web Application Security—eSecurity Planet" cited on IDS dated Feb. 27, 2015.*
"Mitigatign Denial of Service Attack using CAPTCHA mechanism" cited on IDS dated Feb. 27, 2015.*
(Continued)

*Primary Examiner* — Tae Kim
(74) *Attorney, Agent, or Firm* — Harrity & Harrity, LLP

(57) ABSTRACT

A security device may receive a request from an attacker device and intended for a server device. The security device may identify the request as being associated with a malicious activity. The malicious activity may include one or more undesirable tasks directed to the server device. The security device may generate an unsolvable challenge-response test based on identifying the request as being associated with the malicious activity. The unsolvable challenge-response test may be generated using at least one construction technique and may be configured in an attempt to block the attacker device without making the attacker device aware that the attacker device is being blocked. The security device may provide the unsolvable challenge-response test to the attacker device, and may receive a solution associated with the unsolvable challenge-response test. The security device may notify the attacker device that the solution is incorrect regardless of whether the solution is actually correct.

20 Claims, 8 Drawing Sheets

(56) References Cited

OTHER PUBLICATIONS

"The Smartest Way to Secure Websites and Web Applications Against Hackers, Fraud and Theft" cited on IDS dated Feb. 27, 2015.*

Thomas Park, "CRAPCHA: Completely Ridiculous and Phony Captcha that Hassles for Amusement", http://thomaspark.me/2013/04/crapcha-completely-ridiculous-and-phony-captcha-that-hassles-for-amusement/, Apr. 1, 2013, 6 pages.

European Search Report corresponding to EP 14 186 502.2, mailed Dec. 4, 2014, 8 pages.

Korner, "Intrusion Deception: The "Tar Trap" Approach to Web Application Security", Jun. 1, 2012, 2 pages, XP055155181.

Mehra et al., "Mitigating Denial of Service attack using CAPTCHA Mechanism", Proceedings of the International Conference & Workshop on Emerging Trends in Technology, ICWET '11, Feb. 25-26, 2011, pp. 284-287, XP055155298.

Mykonos Software, The Smartest Way to Secure Websites and Web Applications Against Hackers, Fraud and Theft, Feb. 27, 2012, 2 pages, XP055155185.

Barnett, "Setting HoneyTraps with ModSecurity: Adding Fake robots.txt Disallow Entries—SpiderLabs Anterior", Aug. 26, 2013, 2 pages, XP055155223.

* cited by examiner

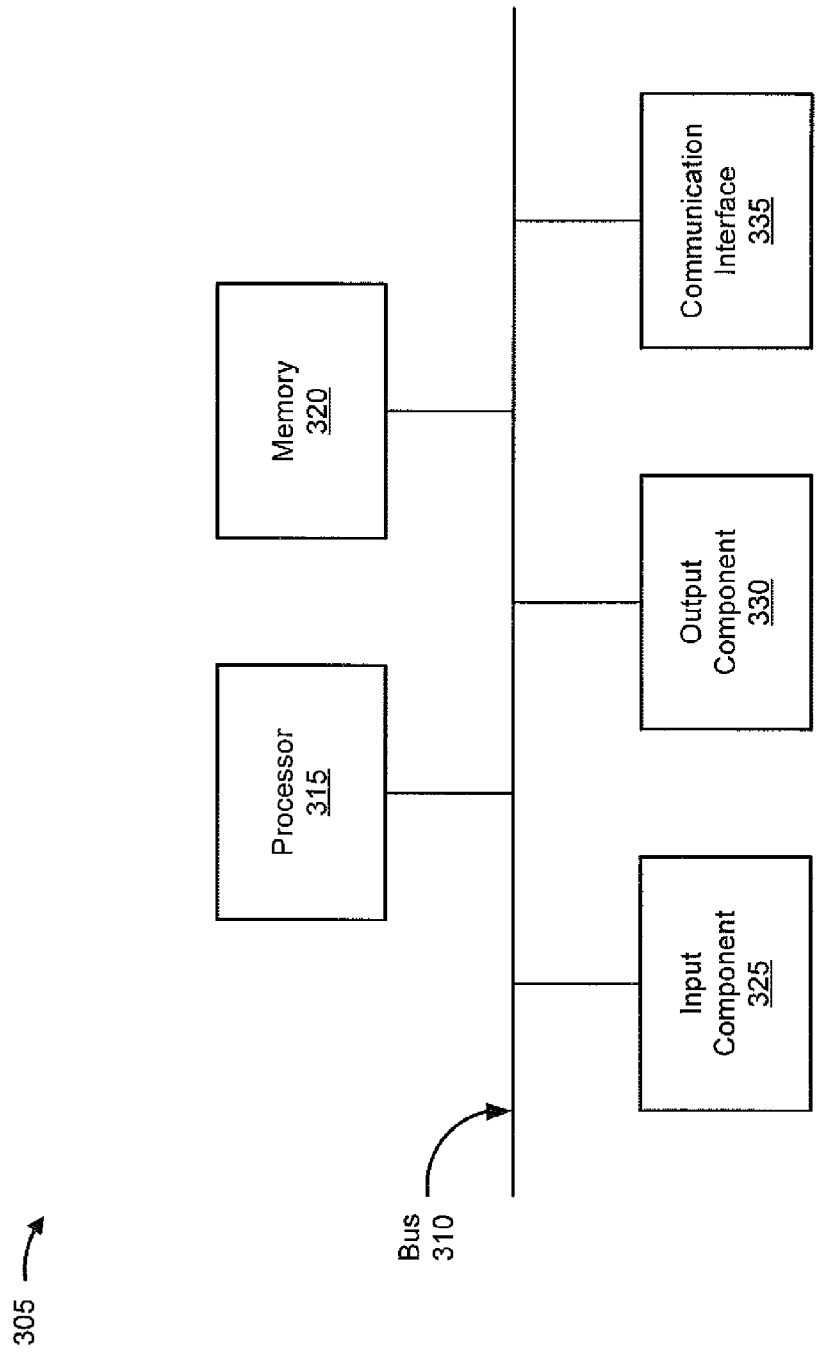

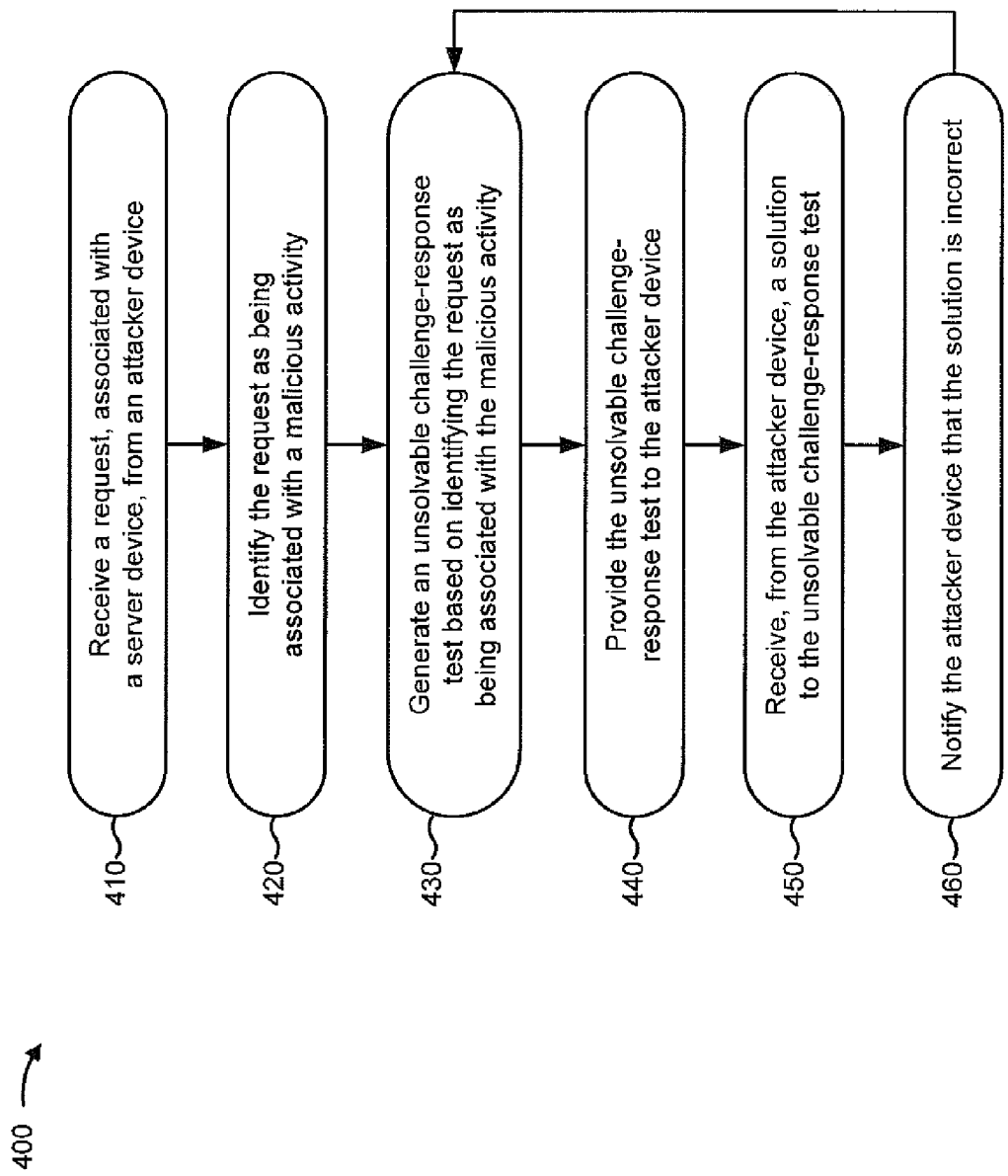

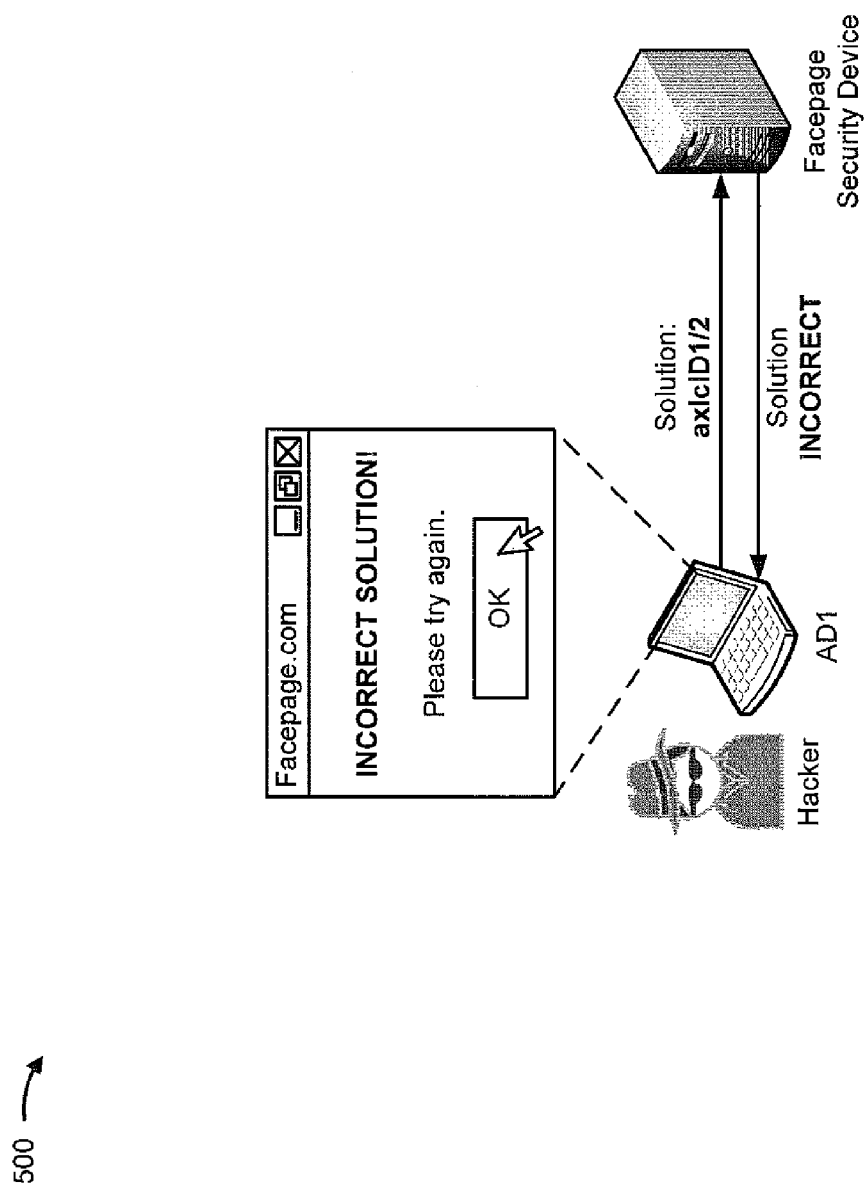

BLOCKING VIA AN UNSOLVABLE CAPTCHA

BACKGROUND

A completely automated public Turing test to tell computers and humans apart ("CAPTCHA") is a type of challenge-response test that may be used to determine whether a device (e.g., a computer device) is being operated by a user (e.g., a human) or by the device (e.g., an automated process being performed by the computing device). A CAPTCHA image may require the user to correctly transcribe distorted characters (e.g., letters) included in the CAPTCHA image (e.g., a device may be unable to identify the distorted characters).

SUMMARY

According to some possible implementations, a security device may include one or more processors to: receive a request from an attacker device and intended for a server device; identify the request as being associated with a malicious activity, where the malicious activity may include one or more undesirable tasks directed to the server device; generate an unsolvable challenge-response test based on identifying the request as being associated with the malicious activity, where the unsolvable challenge-response test may be generated using at least one construction technique, and where the unsolvable challenge-response test may be configured in an attempt to block the attacker device without making the attacker device aware that the attacker device is being blocked; provide the unsolvable challenge-response test to the attacker device; receive, from the attacker device, a solution associated with the unsolvable challenge-response test; and notify the attacker device that the solution is incorrect regardless of whether the solution is actually correct.

According to some possible implementations, a computer-readable medium may store one or more instructions that, when executed by one or more processors, cause the one or more processors to: receive, from an attacker device, a request for information stored by a server device; determine that the request is indicative of a malicious activity, where the malicious activity may be associated with a performance of an undesirable task directed to the server device; construct an unsolvable completely automated public Turing test to tell computers and humans apart (CAPTCHA), using one or more construction techniques, based on determining that the request is indicative of the malicious activity, where the unsolvable CAPTCHA may be designed to block the attacker device from sending the request to the server device without informing the attacker device that the attacker device is being blocked; send the unsolvable CAPTCHA to the attacker device; receive a proposed solution associated with the unsolvable CAPTCHA from the attacker device; and inform the attacker device that the proposed solution is incorrect regardless of whether the proposed solution is actually correct.

According to some possible implementations, a method may include: receiving, by a security device, a request to provide information associated with a server device; identifying, by the security device, the request as being associated with an undesirable task directed to the server device; generating, by the security device, an unsolvable challenge-response test using a group of construction techniques, where the unsolvable challenge-response test may be generated in a manner that does not indicate that the security device is blocking the attacker device from sending the request to the server device; providing, by the security device, the unsolvable challenge-response test; receiving, by the security device, an answer associated with the unsolvable challenge-response test, where the answer may be provided by the attacker device; and notifying, by the security device, the attacker device that the answer is incorrect regardless of whether the answer is actually correct.

BRIEF DESCRIPTION OF THE DRAWINGS

FIG. 3 is a diagram of example components of one or more devices of FIG. 2;

FIG. 4 is a flow chart of an example process for blocking an attacker device using an unsolvable challenge-response test; and FIGS. 5A-5D are diagrams of an example implementation relating to the example process shown in FIG. 4.

DETAILED DESCRIPTION

The following detailed description of example implementations refers to the accompanying drawings. The same reference numbers in different drawings may identify the same or similar elements.

A security device (e.g., associated with protecting a server device) may wish to block an attacker device (e.g., associated with a hacker) that may attempt to engage in a malicious activity (e.g., spidering, scraping, phishing, etc.) associated with an application (e.g., a web application hosted by the server device). However, the security device may wish to block the attacker device in a manner such that the attacker device (e.g., the hacker) is not aware that the attacker device is being blocked (e.g., since the attacker device may attempt to bypass the block when the attacker device is aware of the block). One method to carry out this type of blocking is to present the attacker device with one or more unsolvable challenge-response tests (e.g., unsolvable CAPTCHAs) that may cause the attacker device to believe that access to the server device is fully functional (e.g., even though the attacker device is being blocked by the security device). Implementations described herein may allow a security device to block an attacker device (e.g., from engaging in a malicious activity) by providing one or more unsolvable challenge-response tests to the attacker device in a manner such that the attacker device is not aware that the attacker device is being blocked.

Figure 1:
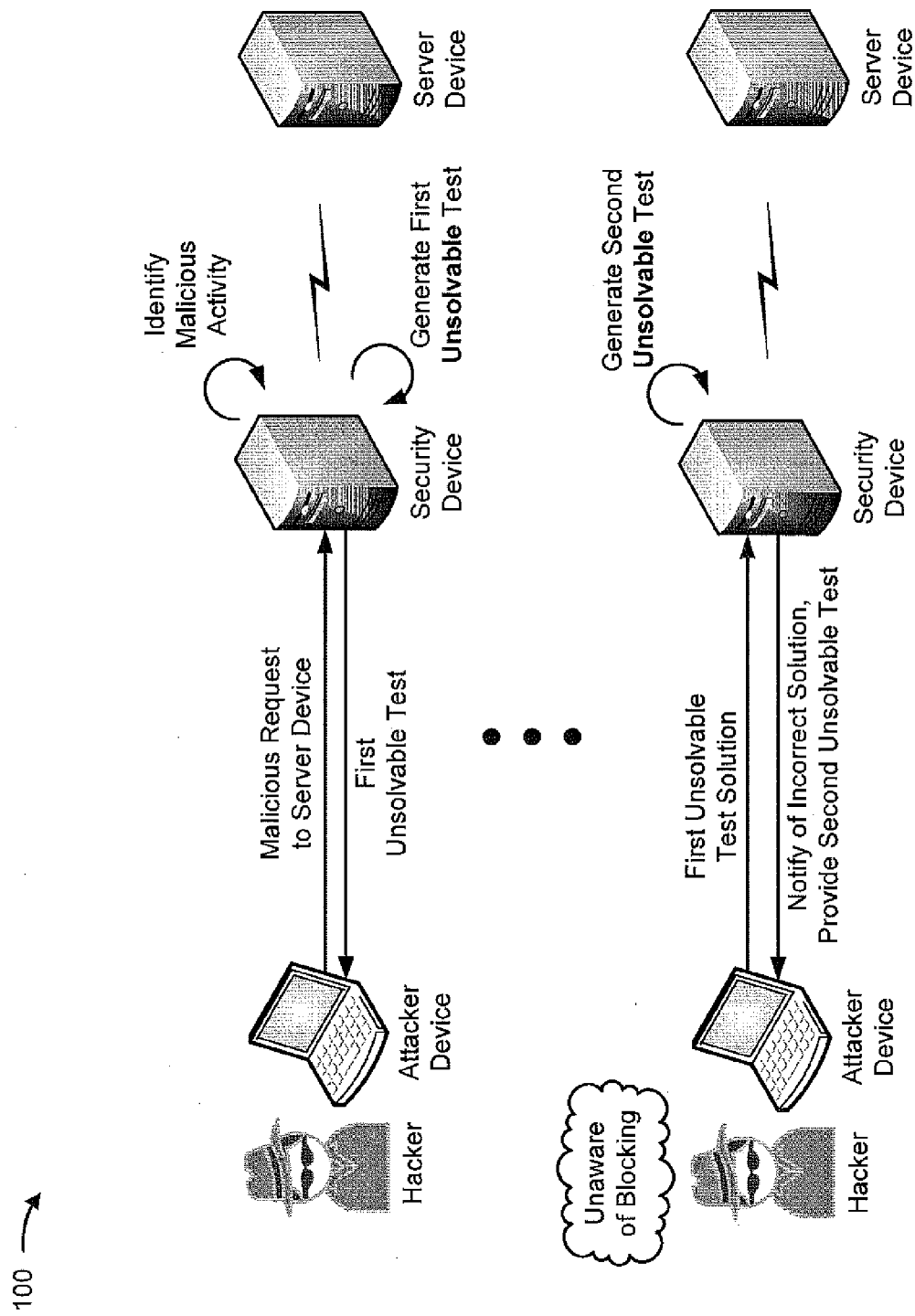
FIG. 1 is a diagram of an overview of an example implementation described herein.

FIG. 1 is a diagram of an overview of an example implementation 100 described herein. For the purposes of example implementation 100, assume that an attacker device (e.g., associated with a hacker) is attempting to engage in a malicious activity, associated with a server device, by sending a malicious request directed to the server device. Further, assume that a security device is positioned to protect the server device from the malicious request provided by the attacker device.

As shown in FIG. 1, the attacker device may send the malicious request intended for the server device. As shown, the security device may receive the request, and may identify the request as being associated with a malicious activity. As shown, the security device may generate (e.g., using information, stored by the security device, associated with one or more construction techniques) a first unsolvable challenge-response test, and may provide the first unsolvable challenge-response test to the attacker device.

As further shown, the hacker may be unaware that the security device is blocking the attacker device from sending the malicious request to the server device, and may attempt to provide a solution to the first unsolvable challenge-response test. As shown, the attacker device (e.g., the hacker) may send a solution associated with the first unsolvable challenge-response test to the security device.

As shown, the security device may receive the solution, and may generate a second unsolvable challenge-response test. As further shown, the security device may send, to the attacker device, a notification that indicates that the solution to the first unsolvable challenge-response test (e.g., provided by the attacker device) was incorrect (e.g., the security device may notify the attacker device that the solution was incorrect even though there is no correct solution). The security device may also send the second unsolvable challenge-response test to the attacker device, as shown.

The security device may continue to block the attacker device from sending the request to the server device by generating additional unsolvable challenge-response tests and providing the additional unsolvable challenge-response tests to the user device. In this way, a security device may block an attacker device (e.g., from engaging in a malicious activity) by generating an unsolvable challenge-response test (e.g., to be provided to the attacker device) in a manner such that the attacker device is not aware that the security device is blocking the attacker device.

Figure 2:
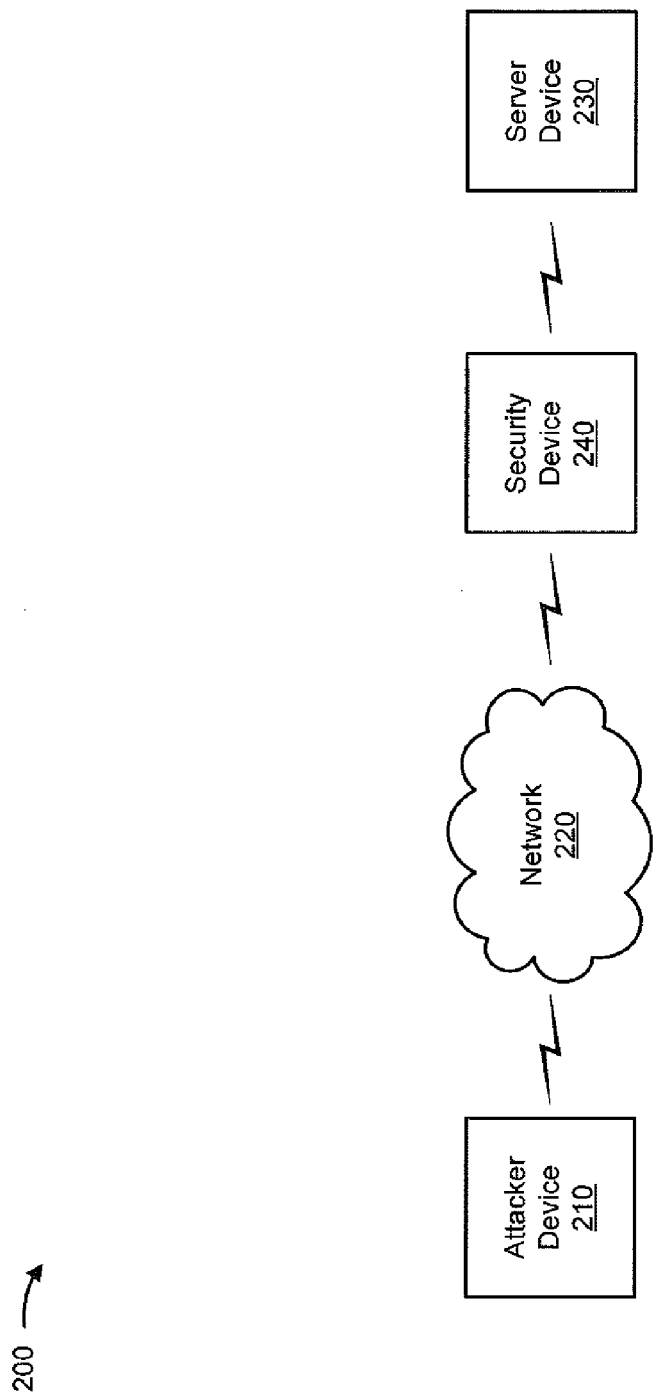
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a attacker device 210, a network 220, a service device 230, and a security device 240.

Attacker device 210 may include one or more devices capable of communicating with other devices (e.g., server device 230) via a network (e.g., network 220), and/or capable of receiving information provided by another device (e.g., server device 230). For example, attacker device 210 may include a computing device, such as a laptop computer, a tablet computer, a handheld computer, a desktop computer, a mobile phone (e.g., a smart phone, a radiotelephone, etc.), a personal digital assistant, or a similar device. In some implementations, attacker device 210 may be capable of generating and sending (e.g., to server device 230) a request (e.g., a request associated an application hosted by server device 230).

Network 220 may include one or more wired and/or wireless networks. For example, network 220 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 220 may allow communication between devices, such as attacker device 210, server device 230, and/or security device 240.

Server device 230 may include one or more devices capable of receiving, providing, generating, storing, and/or processing information received and/or provided via a network (e.g., network 220) and/or another device (e.g., security device 240). For example, server device 230 may include a computing device, such as a server (e.g., an application server, a content server, a host server, a web server, etc.). In some implementations, server device 230 may be protected (e.g., from a malicious activity) by security device 240.

Security device 240 may include one or more devices capable of receiving, providing, generating, storing, and/or processing information received and/or provided via a network (e.g., network 220) and/or another device (e.g., server device 230, attacker device 210, etc.). For example, security device 240 may include a computing device, such as a server. In some implementations, security device 240 may receive information from and/or provide information to attacker device 210 (e.g., via network 220) and/or server device 230. Additionally, or alternatively, security device 240 may include one or more devices capable of processing and/or transferring communications (e.g., a request, a response, etc.) between attacker device 210 and server device 230. For example, security device 240 may include a network device, such as a reverse proxy, a server (e.g., a proxy server), a traffic transfer device, a firewall, a router, a load balancer, or the like.

In some implementations, security device 240 may be capable of identifying a malicious activity associated with a request (e.g., received from attacker device 210 and directed to server device 230). Additionally, or alternatively, security device 240 may be capable of generating an unsolvable challenge-response test (e.g., an unsolvable CAPTCHA). Additionally, or alternatively, security device 240 may be capable of protecting server device 230 from a malicious activity associated with attacker device 210.

Security device 240 may be used in connection with a single server device 230 or a group of server devices 230 (e.g., a data center). Communications may be routed through security device 240 to reach the one or more server devices 230. For example, security device 240 may be positioned within a network as a gateway to a private network that includes one or more server devices 230.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 is a diagram of example components of a device 300. Device 300 may correspond to attacker device 210, server device 230, and/or security device 240. Additionally, or alternatively, each of attacker device 210, server device 230, and/or security device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

FIG. 4 is a flow chart of an example process 400 for blocking an attacker device using an unsolvable challenge-response test. In some implementations, one or more process blocks of FIG. 4 may be performed by security device 240. In some implementations, one or more process blocks of FIG. 4 may be performed by another device or a group of devices separate from or including security device 240, such as server device 230.

As shown in FIG. 4, process 400 may include receiving a request, associated with a server device, from an attacker device (block 410). For example, security device 240 may receive a request, associated with server device 230, from attacker device 210. In some implementations, security device 240 may receive the request from attacker device 210 when attacker device 210 sends the request via network 220. In some implementations, security device 240 may receive the request before server device 230 receives the request (e.g., security device 240 may be positioned between attacker device 210 and server device 230 within network 220).

A request may include a message, sent from attacker device 210 to server device 230 (e.g., via security device 240 and/or network 220), that identifies a resource (e.g., a HyperText Markup Language ("HTML") file, an image file, a video file, an audio file, information associated with a user account, etc.) that attacker device 210 wishes to receive from server device 230.

In some implementations, the request may include information that identifies attacker device 210 (e.g., a string of characters that identifies client device, 210, a network address associated with attacker device 210, a port number associated with attacker device 210, etc.). Additionally, or alternatively, the request may include information that identifies server device 230 (e.g., a string of characters that identifies server device 230, a network address associated with server device 230, a port number associated with server device 230, a URL associated with a website hosted by server device 230, etc.). Additionally, or alternatively, the request may include information that identifies the resource requested by attacker device 210, such as a uniform resource identifier ("URI").

In some implementations, security device 240 may receive the request based on information included in the request. For example, security device 240 may receive the request based on a network address, associated with server device 230, included in the request (e.g., when security device 240 is positioned to receive requests destined for server device 230). As an additional example, security device 240 may receive the request based on information associated with a website (e.g., a URL) included in the request (e.g., when security device 240 is configured to receive requests associated with the website).

As further shown in FIG. 4, process 400 may include identifying the request as being associated with a malicious activity (block 420). For example, security device 240 may identify the request, received from attacker device 210, as being associated with a malicious activity. In some implementations, security device 240 may identify the request as being associated with the malicious activity when security device 240 receives the request from attacker device 210 (e.g., after security device 240 receives the request).

In some implementations, security device 240 may identify the request as being associated with the malicious activity based on information included in the request. For example, security device 240 may identify the request as being associated with the malicious activity based on information (e.g., a network address) that identifies attacker device 210 (e.g., when attacker device 210 is known to have engaged in malicious activity in the past). Additionally, or alternatively, security device 240 may identify the request as being associated with the malicious activity based on activity related to one or more other requests received from attacker device 210. For example, security device 240 may receive, from attacker device 210, a quantity of requests (e.g., a quantity of requests associated with several links on a website, a quantity of requests associated with a particular user account), which may be indicative of undesirable scripted activity (e.g., spidering, scraping, unauthorized access to a user account, etc.).

As an additional example, security device 240 may identify the request as being associated with a malicious activity based on receiving a quantity of requests that satisfies a threshold quantity of requests (e.g., when the quantity of requests received exceeds the threshold quantity of requests, security device 240 may identify the request as being associated with the malicious activity, etc.). As an another example, security device 240 may identify the request as being associated with a malicious activity based on receiving a quantity of requests within a particular threshold amount of time (e.g., when the quantity of requests are received within the threshold amount of time, security device 240 may identify the request as being associated with the malicious activity, etc.).

In some implementations, security device 240 may identify the request as being associated with the malicious activity based on receiving a request with a known attack signature (e.g., security device 240 may store information that identifies the known attack signature, and may recognize the attack signature based on the content of the request). In some implementations, security device 240 may identify the request as being associated with a malicious activity based on information associated with one or more previous requests (e.g., a server log stored by security device 240 and/or server device 230 that indicates that the request may be associated with the malicious activity).

In some implementations, security device 240 may identify the request as being associated with the malicious activity based on a probability, determined by security device 240, that the request is associated with the malicious activity. For example, security device 240 may determine (e.g., based on information associated with the request, based on information associated with attacker device 210, based on information associated with another request received from attacker device 210, etc.) a score, associated with the request, and the score may reflect a probability that the request is associated with the malicious activity. In this example, if the score satisfies a threshold, then security device 240 may identify the request as being associated with the malicious activity. Conversely, if the score does not satisfy the threshold, then security device 240 may not identify the request as being associated with the malicious activity.

In some implementations, security device 240 may store information based on identifying the request as being associated with the malicious activity, such as information that identifies attacker device 210 (e.g., a network address, etc.), information, associated with the request, used to identify the request as being associated with the malicious activity (e.g., a date the request was received, a time the request was received, etc.), or the like. In some implementations, security device 240 may not forward the request to server device 230 when security device 240 identifies the request as being associated with the malicious activity (e.g., security device 240 will stop the request from being sent to server device 230).

As further shown in FIG. 4, process 400 may include generating an unsolvable challenge-response test based on identifying the request as being associated with the malicious activity (block 430). For example, security device 240 may generate an unsolvable challenge-response test (e.g., an unsolvable CAPTCHA) based on identifying the request, received from attacker device 210, as being associated with the malicious activity. In some implementations, security device 240 may generate the unsolvable challenge-response test when security device 240 identifies the request as being associated with the malicious activity. Additionally, or alternatively, security device 240 may generate the unsolvable challenge-response test when security device 240 receives information, indicating that security device 240 may generate the unsolvable challenge-response test, from another device (e.g., server device 230).

A challenge-response test may include a type of authentication where one party (e.g., security device 240) presents a question (e.g., a "challenge") and another party (e.g., attacker device 210) is required to provide a valid solution (e.g., a "response") to be authenticated. An unsolvable challenge-response test may include a challenge-response test that does not have a correct solution and/or a challenge-response test where attacker device 210 may be incapable of providing the correct solution (e.g., when the correct solution includes a character that may not be typed using a standard keyboard, etc.). In some implementations, security device 240 may generate the unsolvable challenge-response test in the form of an unsolvable CAPTCHA. In some implementations, security device 240 may generate the unsolvable CAPTCHA using one or more construction techniques that are designed to block attacker device 210 from sending a request to server device 230 without making attacker device 210, and/or a user of attacker device 210 (e.g., a hacker), aware that attacker device 210 is being blocked (e.g., by security device 240) from sending the request to server device 230.

A construction technique may include a manner in which the unsolvable CAPTCHA is generated by security device 240. For example, security device 240 may construct the unsolvable CAPTCHA by including a character in the CAPTCHA that attacker device 210 may not be able to input (e.g., using a standard English keyboard), such as a fraction (e.g., ½, ¼, etc.), a symbol (e.g., ©, ☺, etc.), a character associated with a foreign (e.g., non-English) language (e.g., ݼ, ܗ, n, etc.), a character that does not exist (e.g., a mirror image of a character), or the like.

As an additional example, security device 240 may construct the unsolvable CAPTCHA by distorting (e.g., by misshaping, by blurring, etc.) a character, included in the unsolvable CAPTCHA, in such that attacker device 210 (e.g., a hacker) may be unable to identify the character (e.g., the character may be so distorted such that the character is unidentifiable).

As an additional example, security device 240 may construct the unsolvable CAPTCHA by requiring attacker device 210 to provide a solution to a complex problem (e.g., a complex mathematical equation, a complex puzzle, etc.).

As an additional example, security device 240 may construct the unsolvable CAPTCHA by including a character in the CAPTCHA that is similar to another character (e.g. a capital letter "O" and a number "0," a lowercase letter "l" and a number "1," etc.). In this example, attacker device 210 and/or the hacker may be unable to determine which of the similar character is displayed in the unsolvable CAPTCHA.

As an additional example, security device 240 may construct the unsolvable CAPTCHA by requiring attacker device 210 to submit a solution in an unreasonable amount of time (e.g., by causing the CAPTCHA to be displayed 1 second and requiring attacker device 210 to submit a solution without being able to view the CAPTCHA again).

As an additional example, security device 240 may construct the unsolvable CAPTCHA by including a first quantity of characters (e.g., 10 characters) in the unsolvable CAPTCHA, but only allowing attacker device 210 to submit a solution containing a second quantity of characters that may be less than the first quantity of characters (e.g., 8 characters). Alternatively, security device 240 may construct the unsolvable CAPTCHA by including a first quantity of characters (e.g., 6 characters) in the unsolvable CAPTCHA, but requiring attacker device 210 to submit a solution containing a second quantity of characters that may be greater than the first quantity of characters (e.g., 10 characters).

As an additional example, security device 240 may construct the unsolvable CAPTCHA by introducing information (e.g., a program code, etc.) such that a user interface, associated with the unsolvable CAPTCHA, is unusable (e.g., an input field included in the user interface may not allow attacker device 210 to input a solution, etc.).

As an additional example, security device 240 may construct the unsolvable CAPTCHA by causing attacker device 210 to display information that indicates that a CAPTCHA could not be generated (e.g., such that attacker device 210 may believe that the CAPTCHA generator is inoperable for other users).

In some implementations, security device 240 may generate the unsolvable CAPTCHA in another manner (e.g., the listed construction techniques are not exhaustive of all possible construction techniques). In some implementations, security device 240 may store information associated with one or more construction techniques (e.g., security device 240 may store a data structure of possible construction techniques).

In some implementations, security device 240 may generate the unsolvable CAPTCHA using one or more construction techniques. Additionally, or alternatively, security device 240 may randomly select one or more construction techniques that are to be used to generate the unsolvable CAPTCHA (e.g., more than one construction technique may be used to generate an unsolvable CAPTCHA). In some implementations, security device 240 may select one or more construction techniques based on information associated with attacker device 210. For example, security device 240 may store information indicating that attacker device 210 has previously engaged in a malicious activity, and security device 240 may select one or more construction techniques, accordingly (e.g., to create a more complex unsolvable CAPTCHA, etc.).

As further shown in FIG. 4, process 400 may include providing the unsolvable challenge-response to the attacker device (block 440). For example, security device 240 may provide the unsolvable challenge-response test to attacker device 210. In some implementations, security device 240 may provide the unsolvable challenge-response test to attacker device 210 when security device 240 generates the unsolvable challenge-response test. Additionally, or alternatively, security device 240 may provide the unsolvable challenge-response test to attacker device 210 when security device 240 receives information, indicating that security device 240 may provide the unsolvable challenge-response test, from another device (e.g., server device 230). In some implementations, security device 240 may provide the unsolvable challenge-response test to attacker device 210 via network 220.

As further shown in FIG. 4, process 400 may include receiving, from the attacker device, a solution to the unsolvable challenge-response test (block 450). For example, security device 240 may receive, from attacker device 210, a solution to the unsolvable challenge-response test. In some implementations, security device 240 may receive the solution when attacker device 210 sends the solution. In some implementations, security device 240 may receive the solution via network 220.

As further shown in FIG. 4, process 400 may include notifying the attacker device that the solution is incorrect (block 460). For example, security device 240 may notify attacker device 210 that the solution (e.g., provided by attacker device 210) to the unsolvable challenge-response test is incorrect. In some implementations, security device 240 may notify attacker device 210 that the solution is incorrect when security device 240 receives the solution from attacker device 210. Additionally, or alternatively, security device 240 may notify attacker device 210 that the solution is incorrect when security device 240 receives information, indicating that security device 240 may notify attacker device 210, from another device (e.g., server device 230).

In some implementations, security device 240 may notify attacker device 210 that the solution is incorrect even when the solution may be correct. Additionally, or alternatively, security device 240 may notify attacker device 210 that the solution is incorrect without determining whether the solution is correct. In other words, security device 240 may always notify attacker device 210 that the solution is incorrect.

In some implementations, security device 240 may notify attacker device 210 that the solution is incorrect, and may allow attacker device 210 to provide another solution to the unsolvable challenge-response test (e.g., attacker device 210 may attempt to solve the unsolvable challenge-response test again). Alternatively, security device 240 may notify attacker device 210 that the solution is incorrect, and may generate another unsolvable challenge-response test that may be provided to attacker device 210 in the manner discussed above.

In this manner, security device 240 may continue to block attacker device 210 from sending a request to server device 230 by generating and providing one or more unsolvable challenge-response tests that are designed to cause attacker device 210 to be unaware that attacker device 210 is being blocked by security device 240.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

FIGS. 5A-5D are diagrams of an example implementation 500 relating to example process 400 shown in FIG. 4. For the purposes of example implementation 500, assume that a hacker, associated with an attacker device (e.g., AD1) is attempting to receive information associated with a Facepage user account (e.g., associated with a Facepage application hosted by a Facepage server) of another user, jsmith (e.g., a user that is not the hacker). Further, assume that a Facepage security device is positioned to protect the Facepage server from a malicious request associated with the Facepage application.

Figure 5A:
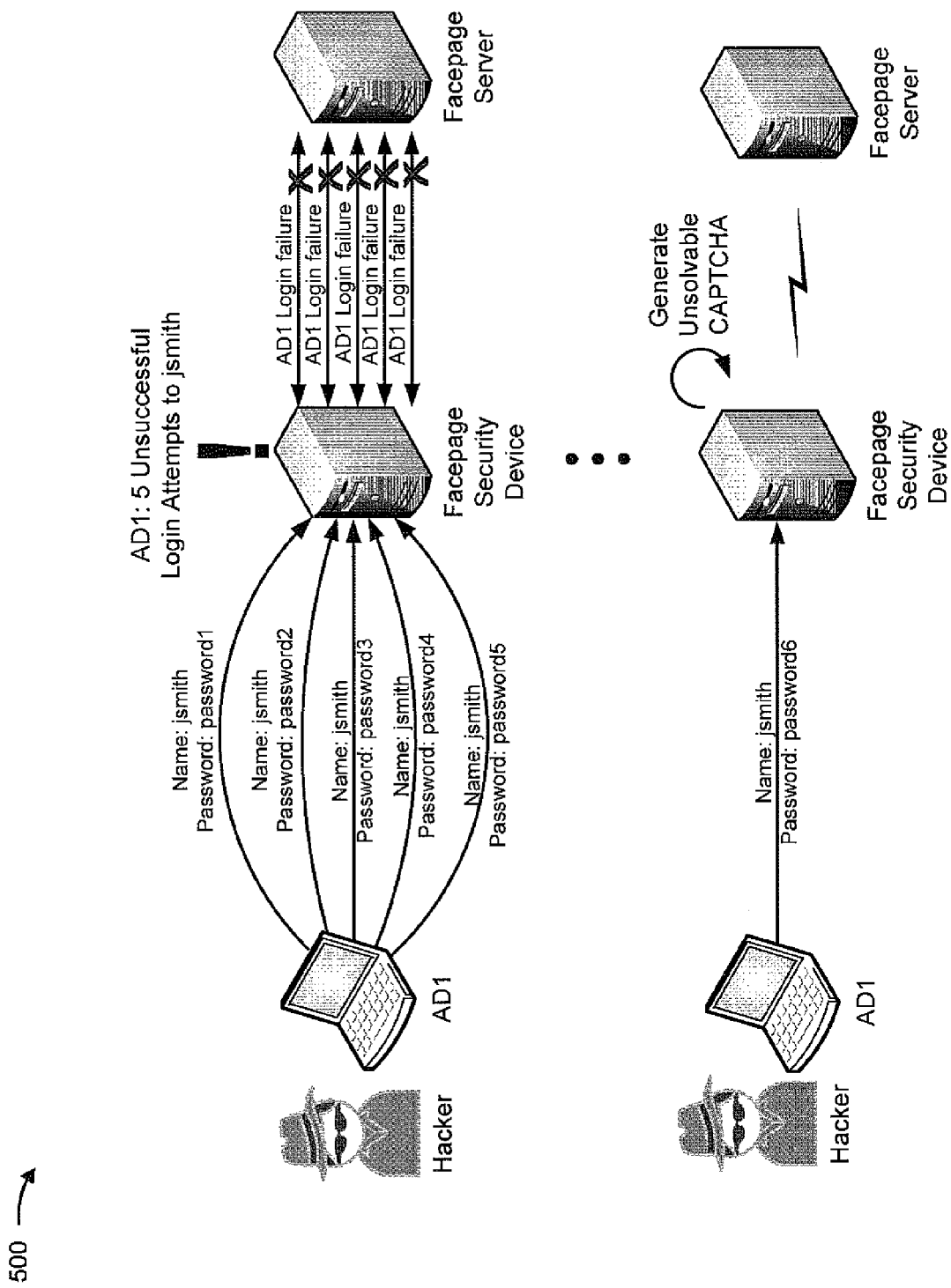

As shown in FIG. 5A, AD1 (e.g., the hacker) may repeatedly attempt to receive information associated with the jsmith user account by attempting to log into the user account using a username (e.g., jsmith) and password (e.g., password1, password2, password3, password4, password5). As further shown, the Facepage server may notify the Facepage security device of each failed AD 1 login attempt. As further shown, the Facepage security device may determine (e.g., based on the information, associated with each failed login attempt, received from the Facepage server) that AD1 has attempted to log into the user account five times, and has submitted an incorrect password during each login attempt. As further shown, the Facepage security device may determine that AD1 is engaging in a malicious activity (e.g., the Facepage security device may determine that five failed login attempts is indicative of a malicious activity).

As further shown in FIG. 5A, AD1 may attempt to log into the user account a sixth time (e.g., using password6) and the Facepage security device may prevent the sixth login attempt from being sent to the Facepage server. As shown, the Facepage security device may determine (e.g., based on identifying AD1 as engaging in a malicious activity) that the Facepage security device may generate an unsolvable CAPTCHA in an attempt to block AD1 from submitting any additional requests to the Facepage server.

Figure 5B:
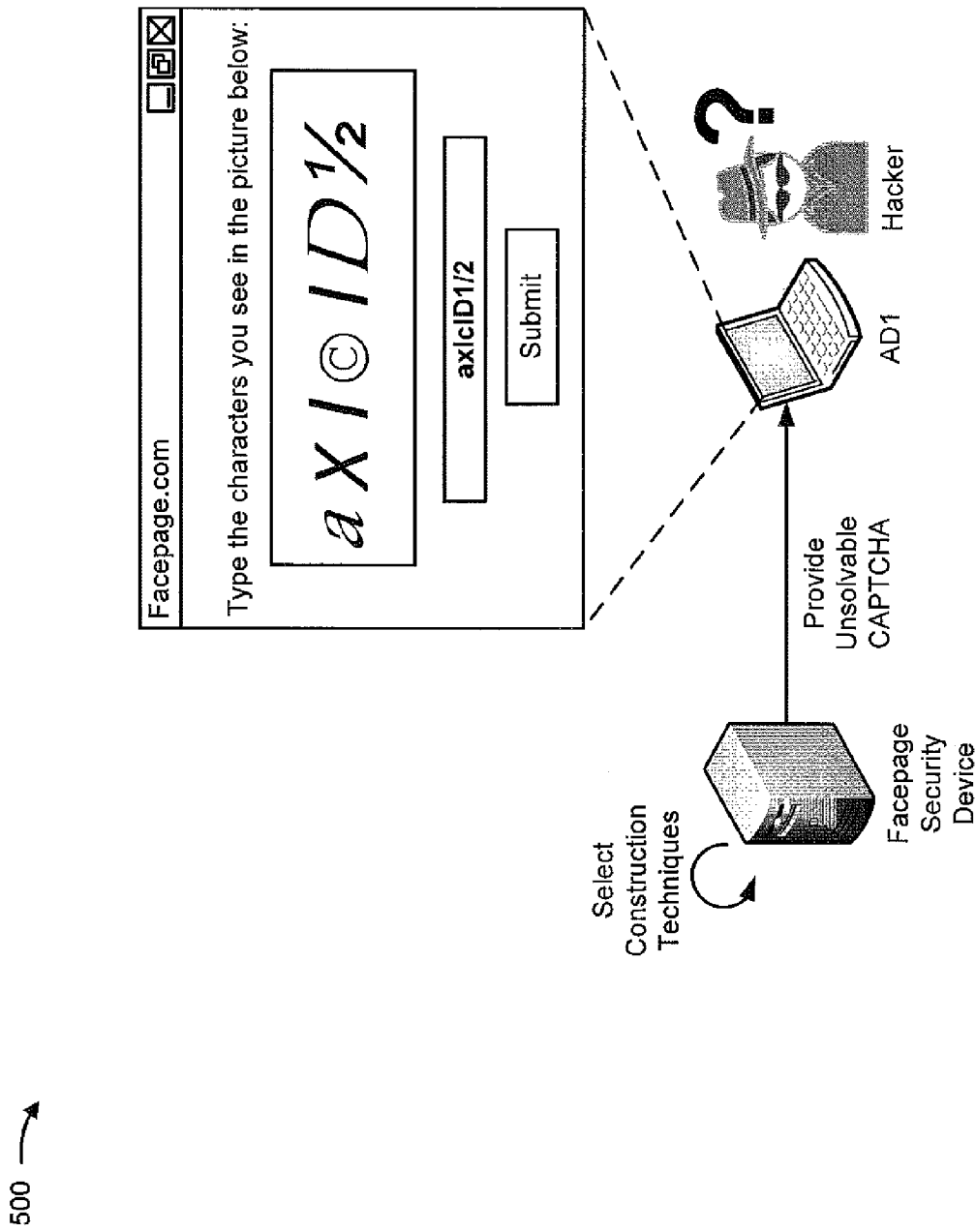

As shown in FIG. 5B, the Facepage security device may select two construction techniques to be used to generate the unsolvable CAPTCHA. For the purposes of FIG. 5B, assume that the Facepage security device selects a construction technique associated with including a character in the CAPTCHA that is similar to another character, and selects a construction technique associated with including a character in the CAPTCHA that AD1 may not be able to input (e.g., using a keyboard). As shown, the Facepage security device may generate the unsolvable CAPTCHA to include a string of characters that includes a lowercase letter "a," a lowercase letter "X," an uppercase letter "I," a symbol "©," a lowercase letter "l," an uppercase letter "D," and a fraction symbol "½" (e.g., AD1 and/or the hacker may be unable to identify the difference between the uppercase letter "I" and the lowercase letter "l," AD1 and/or the hacker may be unable to enter the "©" symbol and/or the fraction symbol "½" using a standard keyboard). As further shown, the hacker may input (e.g., via AD1) a solution, associated with the unsolvable CAPTCHA, that includes a string of characters "axlclD½."

As shown in FIG. 5C, AD1 may provide the solution to the Facepage security device, and the Facepage security device may send a notification to AD1 that indicates that the solution, provided by AD1, is incorrect. As further shown, the notification may prompt the hacker to attempt to solve another CAPTCHA (e.g., without the hacker becoming aware that AD1 is being blocked from sending the sixth login request to the Facepage server device). The hacker may indicate that the hacker wishes to attempt another CAPTCHA by clicking an "OK" button on a user interface associated with the notification.

Figure 5D:
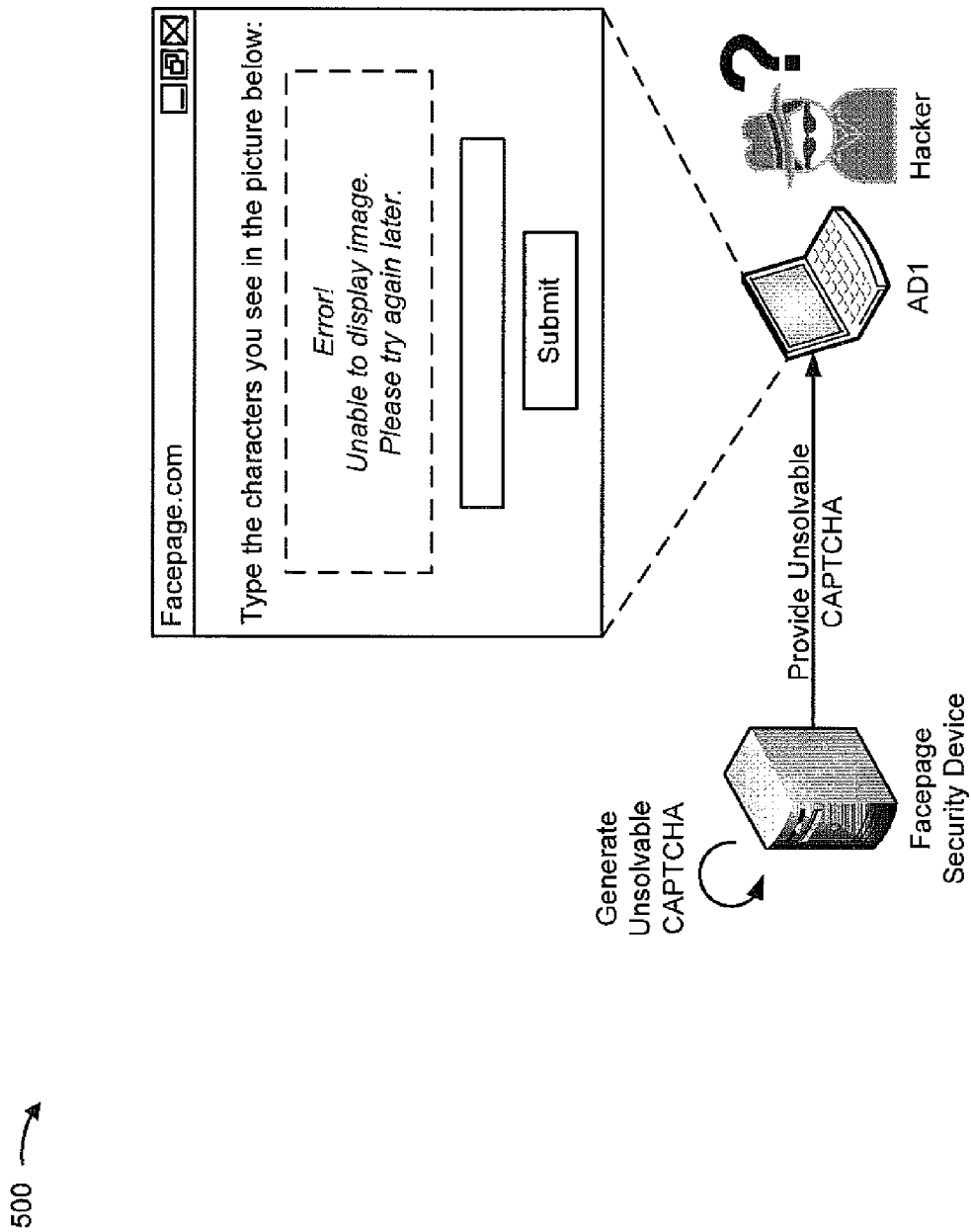

As shown in FIG. 5D, the Facepage security device may generate another unsolvable CAPTCHA. For the purposes of FIG. 5D, assume that the Facepage security device selects a construction technique associated with displaying an error that indicates that a CAPTCHA could not be generated (e.g., that the Facepage server device is experiencing a problem when generating CAPTCHA). As shown, the Facepage security device may generate the unsolvable CAPTCHA in a manner that may cause AD1 to display an error message (e.g., "Error! Unable to display image. Please try again later."), and may provide the unsolvable CAPTCHA to AD1. As shown, the hacker associated with AD1 may believe that the CAPTCHA generator is inoperable (e.g., the hacker may not be aware that the Facepage security device is blocking AD1), and the hacker may discontinue attempting to log into the user account (e.g., or the hacker may attempt to log into the user account again and may receive another unsolvable CAPTCHA from the Facepage security device).

As indicated above, FIGS. 5A-5D are provided merely as an example. Other examples are possible and may differ from what was described with regard to FIGS. 5A-5D.

Implementations described herein may allow a security device to block an attacker device (e.g., from engaging in a malicious activity) by providing one or more an unsolvable challenge-response tests to the attacker device in a manner such that the attacker device is not aware that the attacker device is being blocked.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A security device, comprising:
   one or more processors, implemented at least partially in hardware, to:
   receive a request from an attacker device and intended for a server device;
   identify the request as being associated with a malicious activity,
   the malicious activity including one or more undesirable tasks directed to the server device;
   generate an unsolvable challenge-response test based on identifying the request as being associated with the malicious activity,
   the unsolvable challenge-response test being generated using a construction technique selected from a plurality of construction techniques,
   the unsolvable challenge-response test being configured in an attempt to block the attacker device without making the attacker device aware that the attacker device is being blocked;
   provide the unsolvable challenge-response test to the attacker device;
   receive, from the attacker device, a plurality of solutions to the unsolvable challenge-response test, the plurality of solutions being different than a username and a password associated with the server device;

notify the attacker device that each solution, of the plurality of solutions, is incorrect regardless of whether the solution is actually correct;

generate another unsolvable challenge-response test using at least one construction technique designed to indicate, to the attacker device, that an error, associated with generating a solvable challenge-response test, has occurred; and provide, to the attacker device and based on generating the other unsolvable challenge-response test, information indicating an error in displaying the solvable challenge-response test.

2. The security device of claim 1,
where the construction technique is randomly selected from the plurality of construction techniques.

3. The security device of claim 1, where the one or more processors, when generating the unsolvable challenge-response test, are to:
generate the unsolvable challenge-response test using at least one construction technique designed to indicate, to the attacker device, that the unsolvable challenge-response test is a solvable challenge-response test.

4. The security device of claim 1, where the unsolvable challenge-response test includes an unsolvable completely automated public Turing test to tell computers and humans apart (CAPTCHA).

5. The security device of claim 1, where the one or more processors, when notifying the attacker device that the solution is incorrect, are to:
notify the attacker device that the solution is incorrect without determining whether a string of characters, included in the solution, is a correct solution associated with the unsolvable challenge-response test.

6. The security device of claim 1, where the unsolvable challenge-response test is a first unsolvable challenge-response test, and the solution is a first solution,
the first unsolvable challenge-response test being generated using a first construction technique; and
where the one or more processors are further to:
generate a second unsolvable challenge-response test using a second construction technique after notifying the attacker device that the first solution is incorrect, the second construction technique being different from the first construction technique;
provide the second unsolvable challenge-response test to the attacker device;
receive a second solution to the second unsolvable challenge-response test; and
notify the attacker device that the second solution is incorrect regardless of whether the second solution is actually correct.

7. The security device of claim 1, where the other unsolvable challenge-response test includes an unsolvable completely automated public Turing test to tell computers and humans apart (CAPTCHA).

8. A non-transitory computer-readable medium storing instructions, the instructions comprising:
one or more instructions that, when executed by one or more processors, cause the one or more processors to:
receive, from an attacker device, a request for information stored by a server device;
determine that the request is indicative of a malicious activity,
the malicious activity being associated with a performance of an undesirable task directed to the server device;
construct an unsolvable completely automated public Turing test to tell computers and humans apart (CAPTCHA), using one or more construction techniques, based on determining that the request is indicative of the malicious activity,
the unsolvable CAPTCHA being designed to block the attacker device from sending the request to the server device without informing the attacker device that the attacker device is being blocked,
the unsolvable CAPTCHA being constructed using a construction technique selected from a plurality of construction techniques send the unsolvable CAPTCHA to the attacker device;
receive a proposed solution to the unsolvable CAPTCHA from the attacker device;
inform the attacker device that the proposed solution is incorrect regardless of whether the proposed solution is actually correct
generate another unsolvable CAPTCHA using at least one construction technique designed to indicate, to the attacker device, that an error, associated with generating a solvable CAPTCHA, has occurred; and
provide, to the attacker device and based on generating the other unsolvable CAPTCHA, information indicating an error in displaying the solvable CAPTCHA.

9. The non-transitory computer-readable medium of claim 8,
where the construction technique is randomly selected from the plurality of construction techniques.

10. The non-transitory computer-readable medium of claim 8,
where the construction technique is designed to indicate, to the attacker device, that the unsolvable CAPTCHA is a solvable CAPTCHA.

11. The non-transitory computer-readable medium of claim 8, where the one or more instructions, that cause the one or more processors to inform the attacker device that the proposed solution is incorrect, cause the one or more processors to:
receive, from the attacker device, another proposed solution to the unsolvable CAPTCHA; and
inform the attacker device that the other proposed solution is incorrect regardless of whether the other proposed solution is actually correct.

12. The non-transitory computer-readable medium of claim 8, where the one or more instructions, that cause the one or more processors to inform the attacker device that the proposed solution is incorrect, cause the one or more processors to:
inform the attacker device that the proposed solution is incorrect without determining whether a string of characters, included in the proposed solution, is a correct solution associated with the unsolvable CAPTCHA.

13. The non-transitory computer-readable medium of claim 8, where the unsolvable CAPTCHA is a first unsolvable CAPTCHA, the proposed solution is a first proposed solution, and the construction technique is a first construction technique; and
where the one or more instructions, when executed by the one or more processors, further cause the one or more processors to:

construct a second unsolvable CAPTCHA using a second construction technique after informing the attacker device that the first proposed solution is incorrect,
the second construction technique being different from the first construction technique;
send the second unsolvable CAPTCHA to the attacker device;
receive a second proposed solution associated with the second unsolvable CAPTCHA; and
inform the attacker device that the second proposed solution is incorrect regardless of whether the second proposed solution is actually correct.

14. The non-transitory computer-readable medium of claim 8, where the one or more instructions, when executed by the one or more processors, further cause the one or more processors to:
randomly select a group of construction techniques from the plurality of construction techniques,
the group of construction techniques including the construction technique; and
where the one or more instructions, that cause the one or more processors to construct the unsolvable CAPTCHA, cause the one or more processors to:
construct the unsolvable CAPTCHA using the group of construction techniques.

15. A method, comprising:
receiving, by a security device and from an attacker device, a request to provide information associated with a server device;
identifying, by the security device, the request as being associated with an undesirable task directed to the server device;
generating, by the security device, an unsolvable challenge-response test using a group of construction techniques,
the unsolvable challenge-response test being generated in a manner that does not indicate that the security device is blocking the attacker device from sending the request to the server device,
the unsolvable challenge-response test being generated using a construction technique selected from a plurality of construction techniques;
providing, by the security device, the unsolvable challenge-response test to the attacker device;
notifying, by the security device, the attacker device that an answer received from the attacker device, to the unsolvable challenge-response test, is incorrect regardless of whether the answer is actually correct;
generating, by the security device, another unsolvable challenge-response test using at least one construction technique designed to indicate, to the attacker device, that an error, associated with generating a solvable challenge-response test, has occurred; and
providing, by the security device and to the attacker device based on generating the other unsolvable challenge-response test, information indicating an error in displaying the solvable challenge-response test.

16. The method of claim 15, further comprising:
randomly selecting a group of construction techniques from the plurality of construction techniques,
the group of construction techniques including the construction technique; and
where generating the unsolvable challenge-response test further comprises:
generating the unsolvable challenge-response test using the group of construction techniques.

17. The method of claim 15, where generating the unsolvable challenge-response test comprises:
generating the unsolvable challenge-response test using at least one construction technique designed to indicate, to the attacker device, that an error, associated with generating a solvable challenge-response test, has occurred.

18. The method of claim 15, where generating the unsolvable challenge-response test comprises:
generating the unsolvable challenge-response test using at least one construction technique designed to indicate, to the attacker device, that the unsolvable challenge-response test is a solvable challenge-response test.

19. The method of claim 15, where the unsolvable challenge-response test includes an unsolvable completely automated public Turing test to tell computers and humans apart (CAPTCHA), and
where notifying the attacker device that each answer, received from the attacker device, is incorrect comprises:
notifying the attacker device that each answer, received from the attacker device, is incorrect without determining whether a string of characters, included in the answer, is a correct answer to the unsolvable challenge-response test.

20. The method of claim 15, where the unsolvable challenge-response test is a first unsolvable challenge-response test, and the answer is a first answer:
the first unsolvable challenge-response test being generated using a first group of construction techniques; and
where the method further comprises:
generating a second unsolvable challenge-response test using a second group of construction techniques after notifying the attacker device that the first answer is incorrect,
the second group of construction techniques being different from the first group of construction techniques;
providing the second unsolvable challenge-response test to the attacker device;
receiving a second answer associated with the second unsolvable challenge-response test; and
notifying the attacker device that the second answer is incorrect regardless of whether the second answer is actually correct.

\* \* \* \* \*